United States Patent

Smith

[15] 3,707,308
[45] Dec. 26, 1972

[54] WHEEL DEVICE
[72] Inventor: Herman Smith, 620 Cochrane Street, Eau Claire, Wis. 54701
[22] Filed: Nov. 18, 1970
[21] Appl. No.: 90,635

[52] U.S. Cl. ................................301/44 R, 301/38 R
[51] Int. Cl. ..............................................B60b 15/22
[58] Field of Search ........301/47, 38 R, 43, 41, 44 R, 301/45, 40 S, 40 R, 46

[56] References Cited

UNITED STATES PATENTS

| | | | |
|---|---|---|---|
| 3,021,179 | 2/1962 | Lindner et al. | 301/47 |
| 2,973,209 | 2/1961 | Shaw | 301/38 R X |
| 3,239,277 | 3/1966 | Beck | 301/47 |
| 2,127,033 | 8/1938 | Johnston | 301/43 |
| 3,382,008 | 5/1968 | Kindlon | 301/47 |
| 1,301,266 | 4/1919 | Holcomb | 301/47 |
| 2,630,349 | 3/1953 | Bower et al. | 301/47 |

Primary Examiner—Robert J. Spar
Attorney—Mark W. Gehan

[57] ABSTRACT

A device for attachment to an automobile wheel to assist in driving the automobile out of snow, mud or other material in which the automobile may be stuck. The device includes a means for attaching radial arms to the outerface of an automobile wheel so that the radial arms extend, parallel to the face of the wheel, approximately to the periphery of the tire on the wheel. The radial arms are provided, at their ends, with heel elements which will grip the surface upon which the automobile rests. As the automobile wheel is caused to turn, the device will then serve to "lift" the automobile from its stuck position.

2 Claims, 5 Drawing Figures

PATENTED DEC 26 1972
3,707,308
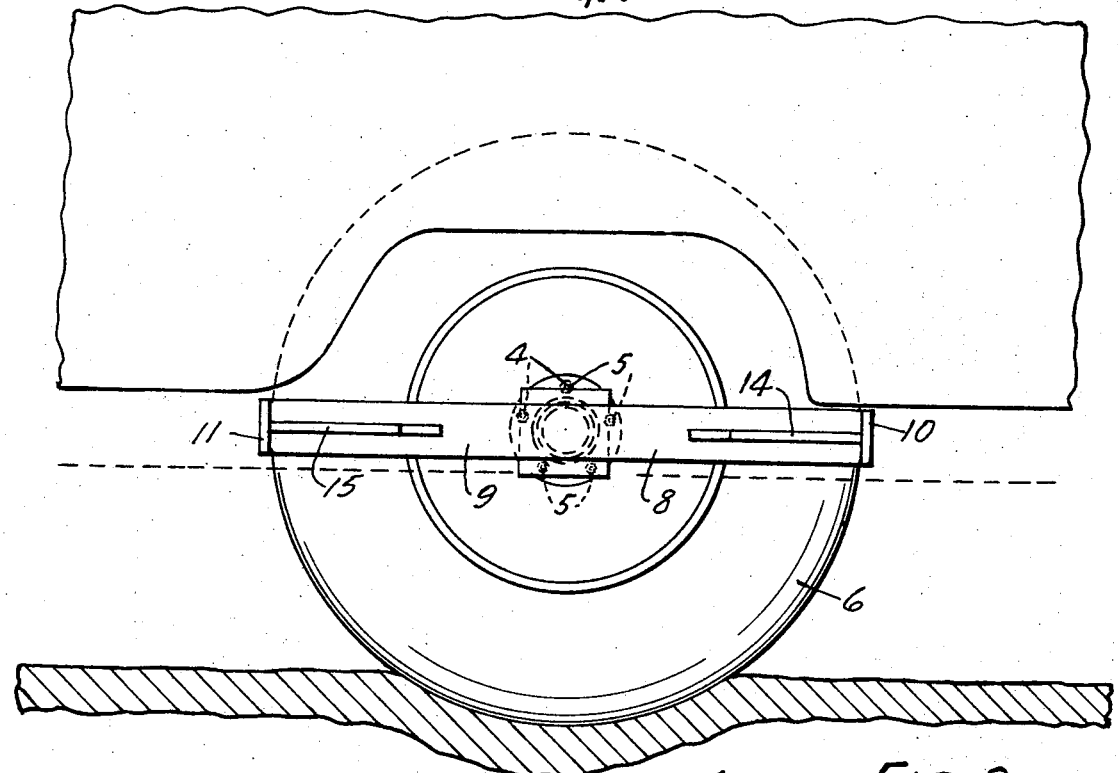
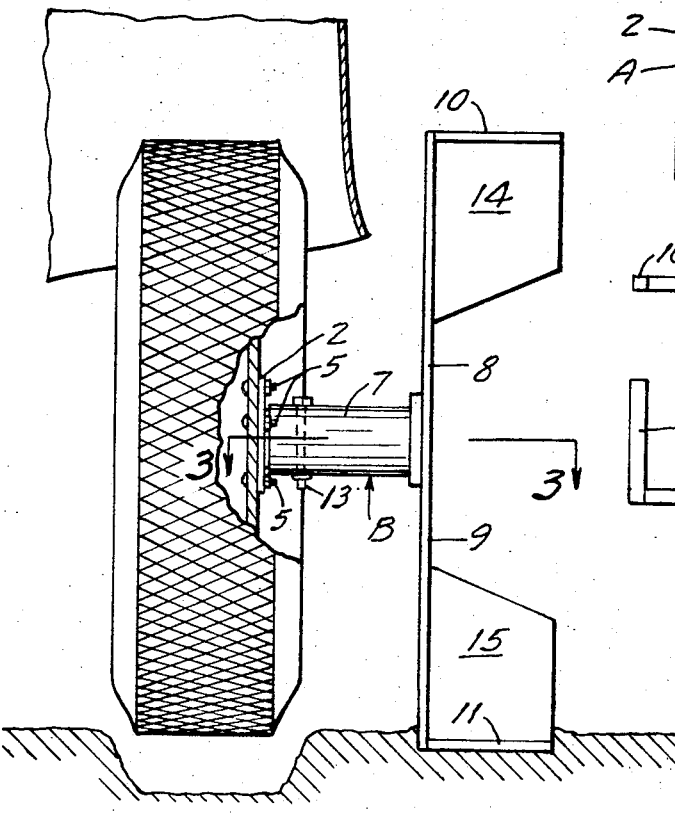
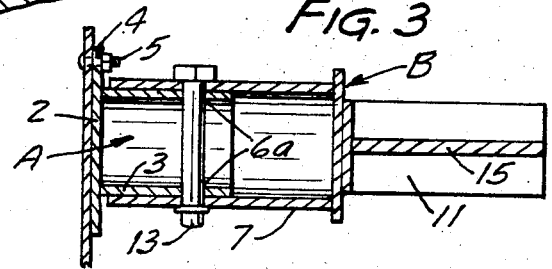
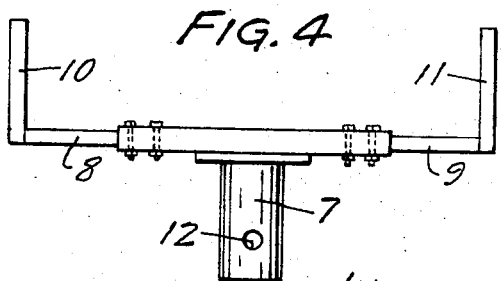
INVENTOR
HERMAN SMITH
Mark W. Gehan
ATTORNEY

WHEEL DEVICE

This invention relates to a wheel device designed to enable the driver of an automobile, which has become stuck in snow or mud or other material, quickly and easily to get the automobile out of its stuck position.

It is intended that one of my devices shall be attached to each driving wheel of the automobile. In most cases, these will be the two rear wheels of the automobile. In automobiles which have "positive traction," it will be necessary to use my device on only one of the driving wheels. My device will perform effectively when the driving wheels are caused to turn either in forward direction (low gear) or reverse direction (reverse gear).

As will hereinafter become apparent, from the detailed description which will be given, my device does not depend solely upon increased traction to get the car out of its stuck position. My device, therefore, differs in principle from chains, lugs, and similar devices which have heretofore been widely used. My device unlike chains etc., employs a lever (or pole vault principle) which actually serves to "lift" the automobile from its mired position.

The essential feature of my device resides in the use of "lift" members such as the radical arms shown in the drawings, and hereinafter described. It will be obvious, of course, that elements other than "arms" (such as struts or plates, etc.) could be used.

Also, although the device as shown in the drawings illustrates one manner of attaching the device to an automobile wheel, it will be obvious that the particular mechanics of attachment are subject to wide variations, without departing from the spirit and substance of my invention.

In the drawings:

FIG. 1 is a side view of an automobile fender and wheel with my device in place.

FIG. 2 is a rear view of the elements shown in FIG. 1 with the device in place. In this view, the device is partly broken away to show its affixation to the wheel.

FIG. 3 is a sectional view along line 3—3 of FIG. 2.

FIG. 4 is a side elevational view of an alternate form of the unit.

FIG. 5 is an outside end view of the device shown in FIG. 4.

Referring now to the drawings in greater detail, with specific reference first to FIG. 3: Reference character A designates a stub shaft assembly which includes flange plate 2. Stub axle 3 is affixed, by welding or other convenient means, to the central portion of one face of flange plate 2. The periphery of flange plate 2 is provided with a series of spaced apertures 4—see FIG. 1. These apertures are spaced apart from each other, and placed so that they will come into register with, and slip over, threaded studs 5; that is studs such as are normally found on the wheel drum of an automobile. Stub axle 3 is provided, at opposed points of its periphery, with openings 6a. By means of these apertures, extension assembly B may be mounted on said stub axle in the manner hereinafter described.

Extension assembly B is made up of tubular shaft 7; radial arms 8 and 9; and heels 10 and 11. One of said heels is attached to the outwardly extending end of each of said radial arms. Tubular shaft 7 has an inner diameter slightly greater than the outside diameter of stub axle 3, and is thereby adapted to slip, sleevelike, over said axle 3.

Tubular shaft 7 is provided with openings 12 which will come into register with the corresponding apertures 6a on stub axle 3 when said tubular shaft 7 is placed over stub axle 3. Bolt or pin 13 is then put through the matching openings on the two components just referred to so that exten-sion assembly B will be held in position upon stub shaft assembly A. Bolt 13 should be a "shear bolt"; that is, it should be sufficiently weak so that it will break if, in use of my device, excessive strain is put on the radial arms.

Radial arms 8 and 9 are preferably made of spring steel and may conveniently be one quarter inch by 2½ inches in cross sectional dimension. The length of each of these radial arms 8 and 9 should be approximately equal or slightly longer than the radius of the automobile wheel upon which the device is to be attached; that is, approximately equal to, or one-quarter to one-half of an inch longer than the distance between the center of the automobile axle and the periphery of the tire on the automobile wheel.

The length of each of the radial arms may be adjusted, by any conventional means, in order to adapt the device for use upon automobile wheels of larger or smaller diameter: See, for example, FIG. 4 of the drawings. However, the weight of my device is increased considerably, if it is made adjustable to fit on wheels of different diameter, so in most cases it is preferable not to include the adjustable feature.

Heels 10 and 11 are affixed to the ends of the radial arms 8 and 9 so as to extend outwardly from the face of the automobile wheel. These heels lie on a plane parallel to the axle of the automobile, and extend at an angle of 90° to the length of the radial arms. These heels may be made in different configurations, as desired. For example, these heels may be made from tubular material approximately 1½ inches in diameter and 6 inches in length. Also, they may be made from material very much like that from which the radial arms are made. The principle reason for making them as long as 6 inches is so that a piece of board, or a tree branch, or a piece of other rigid material can be inserted under the heel, when the device is in use, so that the radial arm will be supported, and not sink into the material (e.g. mud) in which the car is mired. If, however, the car is stuck on ice, or semi-ice, it would not be necessary for the heels to be that long. In fact, for such usage they could constitute merely a bulbous or ball like "head" on the end of the arms.

The heels will be subjected to considerable force when the device is in use. They must, therefore, be affixed to the radial arms very securely, to withstand the strain involved, when the car is being lifted out of the mud or snow by my device. I have found one convenient method of support to be the pads 14 and 15, shown particularly in FIG. 2 of the drawings. Also, when the automobile is deeply mired, as is shown by the broken lines in FIG. 1, said pads 14 and 15 will serve as a flat base, enlarging the tips of the radial arms, so that the radial arms will not sink as easily as they otherwise might into mud or soft snow.

Stub shaft assembly A illustrates one means whereby an auxiliary axle stub may be obtained—so that extension assembly B, which constitutes the essence of my invention, may be mounted in operating position. It is of course feasible that the automobile axle per se could be made longer, by the automobile wheel manufacturer, so that the need to extend the length of the axle, which I achieve by assembly A, could be eliminated.

Stub shaft assembly A would normally be left on the automobile at all times. If the automobile became stuck in snow or mired in mud, the wheel disc of the automobile could be quickly removed and extension assembly B could be set in place. As above indicated, one of my devices should be used on each driving wheel, unless the car has "positive traction." It may readily be seen that attachment of my device, and its use, is extremely simple. I have found that two radial arms do the job effectively, but additional arms could be incorporated in the device without detrimental effect. The extension assembly B should not be left on the automobile, when the automobile is in normal use. In other words the assembly B should be removed after the car is moved out of its stuck position. Also, the wheels of the automobile should not be caused to turn too rapidly, when my device is being used. The wheels should be turned slowly, so that the radial arms will be brought gradually into lifting position.

Having thus described the invention, what I claim is:

1. A wheel device for affixation to a driving wheel of an automotive vehicle which has become mired, said device being adapted to move said vehicle out of mired position; said device including a stub shaft assembly and an extension assembly; said stub shaft assembly comprising a flange plate and a stub axle, said flange plate being removably attachable to the studs on said wheel; said stub axle projecting outwardly from the face of said flange plate and being adapted to receive and hold said extension assembly; said extension assembly including a shaft adapted for attachment to said stub axle, and at least one radial arm projecting from said shaft on a plane parallel to the face of said wheel, said arm extending slightly beyond the periphery of a tire mounted upon said wheel and having thereat an outwardly extending cantilevered ground engaging projection, said wheel device rotating when said wheel is caused to rotate, said ground engaging projection on said radial arm thereupon being caused to press upon and into material in which said vehicle is mired, thereby lifting said vehicle and impelling same out of mired position.

2. A wheel device for affixation to a driving wheel of an automotive vehicle which has become mired, said wheel being mounted upon the driving axle of said vehicle by means of a plurality of studs passing through said wheel, said device being adapted to move said vehicle out of mired position; said device including (a) a stub shaft assembly and (b) an extension assembly; said stub shaft assembly comprising a flange plate and a stub axle, said flange plate being provided with apertures about its periphery, said flange plate thus being removably attachable to the studs upon which said wheel is mounted; said stub axle projecting outwardly a short distance from the face of said flange plate and being adapted to receive and hold said extension assembly; said extension assembly including a shaft adapted for attachment to said stub axle, and at least one radial arm projecting from said shaft on a plane parallel to the face of said wheel, said arm extending slightly beyond the periphery of a tire mounted upon said wheel, and being non-yielding and non-compressible, said wheel device rotation when said wheel is caused to rotate, said radial arm thereupon being caused to press upon and into material in which said vehicle is mired, the free end of said radial arm being provided with an outwardly projecting cantilevered heel adapted to prevent said radial arm from penetrating too deeply into the material in which the vehicle is mired, said rotation thereby lifting said vehicle and impelling same out of mired position, by means of a "pole vault" type of action; said extension assembly being readily detachable from said stub axle when said device is not in use, so as not to cause an imbalance of said wheel when the vehicle is used at ordinary speeds.

* * * * *